UNITED STATES PATENT OFFICE.

JULES VILLE, OF MONTPELLIER, FRANCE.

RED DYE.

SPECIFICATION forming part of Letters Patent No. 591,309, dated October 5, 1897.

Application filed February 10, 1897. Serial No. 622,857. (Specimens.)

*To all whom it may concern:*

Be it known that I, JULES VILLE, of Montpellier, France, have invented certain new and useful Improvements in Coloring-Matters of the Triphenylmethane Series, which are fully described in the following specification.

I have discovered that not only aromatic hydrazins but also fatty hydrazins and simple hydrazins react on rosolic acid, producing coloring-matters useful in dyeing. Thus if I heat in a closed vessel rosolic acid, ten kilograms; sulfate of hydrazin, thirteen kilograms, and caustic soda, four kilograms, for twenty-four hours at about 100° centigrade I find that a red coloring-matter is at first produced, which afterward changes into blue, and finally is converted into violet.

In the preceding reaction I may replace hydrazin by methyl and ethyl hydrazins.

The coloring-matters obtained are of the same character as those described in my application, Serial No. 622,856, filed February 10, 1897, and may be used for dyeing in the same way.

The completed product is a pulverulent mass, varying in shade from yellow-red to red-brown, having a brilliant reflection. It dissolves in alcoholic and acetic acid forming solutions of red color, and in concentrated hydrochloric and sulfuric acids forming solutions of yellow color. By dilution with water these solutions become bright red. The acid solutions are precipitated by alkalies and the precipitate is red. These products dye animal fibers directly.

Having thus described my invention, what I claim as new, and desire to secure by Letters Patent, is—

1. The process of producing coloring-matters by heating a fatty hydrazin with rosolic acid, substantially as described.

2. The described red coloring-matters resulting from heating a fatty hydrazin with rosolic acid, said coloring-matters being a pulverulent mass, having a brilliant reflection, soluble in alcohol and acetic acid forming red solutions, and in hydrochloric and sulfuric acids forming yellowish solutions, as set forth.

In testimony whereof I have signed this specification in the presence of two subscribing witnesses.

JULES VILLE.

Witnesses:
    ESTRE, CH.
    W. ARNOT.